(12) United States Patent
Lappetelainen et al.

(10) Patent No.: US 9,042,343 B2
(45) Date of Patent: May 26, 2015

(54) METHOD, APPARATUS AND SYSTEM FOR REDIRECTING DATA TRAFFIC

(75) Inventors: Antti Tuomas Lappetelainen, Espoo (FI); Juha-Matti Tuupola, Tampere (FI); Timo Eriksson, Espoo (FI); Mikko Hurskainen, Helsinki (FI); Risto Suoranta, Tampere (FI); Antti Latva-Aho, Lempaala (FI); Pasi Katajainen, Tampere (FI)

(73) Assignee: Notava Oy, Espoo (FI)

( * ) Notice: Subject to any disclaimer, the term of this patent is extended or adjusted under 35 U.S.C. 154(b) by 175 days.

(21) Appl. No.: 13/578,394

(22) PCT Filed: Dec. 22, 2010

(86) PCT No.: PCT/FI2010/051077
§ 371 (c)(1),
(2), (4) Date: Oct. 22, 2012

(87) PCT Pub. No.: WO2011/098659
PCT Pub. Date: Aug. 18, 2011

(65) Prior Publication Data
US 2013/0039340 A1 Feb. 14, 2013

(30) Foreign Application Priority Data
Feb. 12, 2010 (FI) ..................... 20100056

(51) Int. Cl.
H04W 48/18 (2009.01)
H04W 12/06 (2009.01)
H04W 88/06 (2009.01)

(52) U.S. Cl.
CPC .............. *H04W 48/18* (2013.01); *H04W 12/06* (2013.01); *H04W 88/06* (2013.01)

(58) Field of Classification Search
CPC ..... H04W 48/18; H04W 12/06; H04W 88/06; H04W 48/16; H04W 4/02; H04W 64/00
USPC ......... 370/229, 236, 237, 254, 328, 338, 351, 370/466; 455/404.2, 456.1
See application file for complete search history.

(56) References Cited

U.S. PATENT DOCUMENTS

2004/0037255 A1 2/2004 Joong et al.
2004/0068570 A1* 4/2004 Haller ........................... 709/228
(Continued)

FOREIGN PATENT DOCUMENTS

| EP | 1 708 526 A1 | 10/2006 |
|---|---|---|
| EP | 2 045 968 A1 | 4/2009 |
| WO | 2004/062114 A2 | 7/2004 |

OTHER PUBLICATIONS

Arun Handa: "Mobile Data Offload for 3G Networks", Intellinet Technologies, Oct. 1, 2009, pp. 1-7, XP002629114, Retrieved from the Internet: URL: http://www.intellinet-tech.com/Media/PagePDF/Date%200ffload.pdf [retrieved on Mar. 17, 2011] "Offloading Data on the Wi-Fi path" p. 5 "Interworking WLAN for Data Offload", pp. 5-6, Cited in ISR.

(Continued)

*Primary Examiner* — Gary Mui
*Assistant Examiner* — Michael Phillips
(74) *Attorney, Agent, or Firm* — Young & Thompson

(57) ABSTRACT

A method, apparatus and system for resource allocation in redirection of data traffic are provided. The method includes receiving a message including a subscription identification, position information associated with the subscription and an action proposal associated with the subscription (200a), selecting at least one local area network based at least in part on the position information (222), mapping the at least one local area network to a local area network server (230), ensuring a valid unique task identification for the subscription in the local area network server, and sending an off-loading indication message including the action proposal, the valid task identification and an identifier of the local area network server to the subscription (200d).

26 Claims, 9 Drawing Sheets

(56) References Cited

U.S. PATENT DOCUMENTS

| | | | |
|---|---|---|---|
| 2004/0205158 A1* | 10/2004 | Hsu | 709/218 |
| 2004/0218605 A1 | 11/2004 | Gustafsson et al. | |
| 2005/0022001 A1* | 1/2005 | Bahl et al. | 713/200 |
| 2006/0070116 A1* | 3/2006 | Park | 726/3 |
| 2006/0209891 A1* | 9/2006 | Yamada et al. | 370/468 |
| 2006/0245407 A1* | 11/2006 | Chen et al. | 370/338 |
| 2007/0026866 A1* | 2/2007 | Krishnamurthi et al. | 455/440 |
| 2008/0140560 A1* | 6/2008 | Hodges et al. | 705/37 |
| 2011/0193718 A1* | 8/2011 | Chevrette et al. | 340/870.02 |

OTHER PUBLICATIONS

Notava Oy: "Notava uAxes offloading solution enables operators to efficiently utilize leased WiFi networks", PR Log—Global Press Release Distribution, Feb. 12, 2010, pp. 1-2, XP002629115, Retrieved from the Internet: URL:http://www.prlog.org/10530361-notava-u axes-offloading-solution-enables-operators-to-efficiently-utilize-leased-wifi-networks.pdf [retrieved on Mar. 17, 2011] the whole document, Cited in ISR.

Dr Risto Suoranta, Antti Lappeteläinen: "uAxes Offloading Rethinking the problem", NOTAVA, May 1, 2010, pp. 1-14, XP002629116, Retrieved from the Internet: URL:http://www.notava.com/notava/uploads/Whitepapers/Rethinking_the_problem_V10.pdf [retrieved on Mar. 17, 2011] the whole document, Cited in ISR.

Finnish Search Report, dated Oct. 7, 2010, from corresponding Finnish application.

* cited by examiner

US 9,042,343 B2

METHOD, APPARATUS AND SYSTEM FOR REDIRECTING DATA TRAFFIC

The instant application is a U.S. National Stage of international application PCT/FI2010/051077, and further claims priority with respect to 35 U.S.C. 371 and 35 U.S.C. 119(a)-(d) to FI 20100056.

TECHNICAL FIELD

The present invention relates to resource allocation and redirection of data traffic.

BACKGROUND

Second generation (2G) and third generation (3G or 3.5G) wide area net-works are widely spread all over the world and provide varying capabilities for mobile applications in terms of bandwidth, coverage and latency. Typically these mobile networks provide data rates that are generally adequate for services employing a low to medium bandwidth applications such as voice communications, text messaging, instant messaging, e-mail with no or relatively small attachments. The data access rates tend to be marginal for services which demand or would otherwise benefit from a higher bandwidth such as multimedia streaming, rich content web browsing, or large file downloads. The greatest advantages of these networks are mobility and the wide area coverage except indoors. On the contrary wireless local area networks (WLAN) offer far better data rates and are today extensively deployed especially in metropolitan areas. The capabilities of mobile devices are growing fast and more advanced devices are consuming more bandwidth in the networks they operate. These devices, the iPhone™ as a prime example, are equipped with both wide area connectivity and local area connectivity, and applications such as web browsers and multimedia streaming applications. This requirement for bandwidth sets new challenges to wide area networks, and thus mechanisms are needed to balance the load off to local area networks having much greater bandwidth capacity. As the wide area data market has become very competitive with flat date offerings, the operators have difficulties justifying the additional investment in wide area infrastructure.

Therefore, there is a need for consumer friendly empowerment for the operator to off-load selected customers to a security enabled wireless local area network installed in an indoor environment the customers are located. The solution improves the capacity of all operator consumers affected by the congestion. The preferred embodiments of the invention realize an instance of a broker machine that reacts on information from wide area network management systems, and holistically and cost efficiently manages the congestion problem. The management happens by selecting the most suitable local area operator and initiating the formation of a NoTA virtual device concept between the selected mobile devices and a server attached with the selected local area network. The selection of the most suitable local area operator can happen based on location information, existing pricing contracts between the wide and local are operators, or in an on-line auction.

SUMMARY

According to a first aspect of the invention, a method comprising receiving a message comprising a subscription identification, position information associated with said subscription and an action proposal associated with said subscription, selecting at least one local area network based at least in part on said position information, mapping said at least one local area network to a local area network server, ensuring a valid unique task identification for said subscription in said local area network server, and sending an off-loading indication message comprising said action proposal, said valid task identification and an identifier of said local area network server to said subscription is provided.

According to a second aspect of the invention, an apparatus comprising a processor capable to execute program code and a suitable memory capable to store program code and data is provided. The program code comprised in the apparatus is configured to, when executed by the processor, cause the apparatus to receive a message comprising a subscription identification, position information associated with said subscription and an action proposal associated with said subscription, select at least one local area network based at least in part on said position information, map said at least one local area network to a local area network server, ensure a valid unique task identification for said subscription in said local area network server, and send an off-loading indication message comprising said action proposal, said valid task identification and an identifier of said selected local area network server to said subscription.

According to a third aspect of the invention, a system comprising a client manager entity and one or more network manager entities. The client manager entity is configured to receive a request to allocate a resource, the request comprising first information associated with a subscription, to select a network manager entity among the one or more network manager entities based at least in part on the request, to exchange second information regarding the resource with the selected network manager entity, and to provide, in response to the exchange of the second information, third information regarding the resource to a client device associated with the subscription. The selected network manager entity is configured to authenticate the client device based at least in part on the third information, and to exchange fourth information regarding the resource with the client device, the exchange of fourth information comprising providing credentials and usage terms associated with the resource to the client device. The system may, optionally, further comprise the client device.

The preferred embodiments of the invention include at least a method, computer program, computer and system for receiving a message including a listing mobile subscriptions, their positions and actions commands attached to each subscription. In one embodiment of the invention the mobile subscriptions are received as telephone numbers, the positions are expressed as cell identification numbers. Further, in a preferred embodiment of the invention the received command relates to the intent of the sender whether the mobile subscription in place should off-load its data traffic from wide area to a local area network or vice versa. An example of a local network is an IEEE 802.11 based Wi-Fi network.

When a message to offload from a wide area network to a local area network has been received, the location information of the mobile subscription is matched with available local area networks. It is done by using the information database and one or more local area networks can be selected as candidates for data off-loading. In an advanced embodiment of the invention, contractual information is used in the selection. The contractual information sets the term of conditions for the wide area operator to use a particular local area network. It should be noted that the contract does not have to be directly between the wide area and the local area network operators; there can be a broker in between, for example. When the contractual information is used, a logical selection policy is cost minimization. In another advanced embodiment of the invention an online auction mechanics is applied to assist the selection process.

The selection of the candidate local area networks is followed by ensuring that the local area network servers governing the selected local area networks are capable of supporting the mobile subscription in the off-loading. In an embodiment of the invention the capability determined as task. The task consists of computation and memory resources and authentication certificate and the task identification index.

In a preferred embodiment of the invention a unique task id is generated and sent to the local area network server and the server replies with confirmation message. In accordance with the previously mentioned embodiment of the invention the task identification index is merged with the address of the selected local area network server and sent to the mobile device identified by the mobile subscription. An example serialization of the task identification is Universal Resource Identifier (URI). In an advanced embodiment only a part of the invention the task identification index is sent allowing the receiver to construct the task identification by its own internal logic. In an embodiment of the invention the invention the task identification index and the certificate are sent using a short-message-service message as specified in the GSM and 3GPP standards.

DETAILED DESCRIPTION

Example of a method, apparatus and computer program for managing network congestion with operator controlled off-load scheme are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement.

As used herein, the term Client Manager (CM) refers to a physical component or set of physical components, e.g. computer hardware, networking infrastructure, and computer software, that provide the means for the wide area network operator to manage the network selection of its subscribers. As used herein, the term Network Manager (NM) refers to a physical component or set of physical components, e.g. computer hardware, networking infrastructure, and computer software, that provide the means for the local area network operator to manage the network selection, providing information about the network related details such as access credentials, and manage client authentication. Herein, the term Client (CL) includes, but is not limited to, a station, a mobile station, user equipment, or a mobile subscriber unit, or any other type of device capable of operating in wireless communication environments. Also, herein, the term WLAN refers to an IEEE 802.11 based wireless communication system and the term 3G refers to a Universal Mobile Telecommunications System (UMTS) wireless communication system. Furthermore the term Wi-Fi is used hereafter to mean Internet access using said WLAN technology.

The preferred embodiments of the invention facilitate methods for performing data off-load from one wireless communication system to another wireless communication system using at least two different communication protocols. The wireless communication systems may be any type of present or future developed wireless communication systems, but not limited to UMTS, High-Speed Packet Access (HSPA), Global System for Mobile Communications (GSM), General Packet Radio Services (GPRS), Code Division Multiple Access 2000 (CDMA2000), and IEEE 802.11 based WLAN systems.

For the purposes of explanation simplicity, the example embodiments are described with reference to a 3G system and a WLAN communication system that provides a network, or a hot spot, within the coverage of 3G system. However, as aforementioned, the descriptions of the preferred embodiments of the invention also apply to other wireless communication systems as well. The operators benefiting from CM include all wide area network operators such as 3G cellular network operators.

Operating Environment

Figure 1:
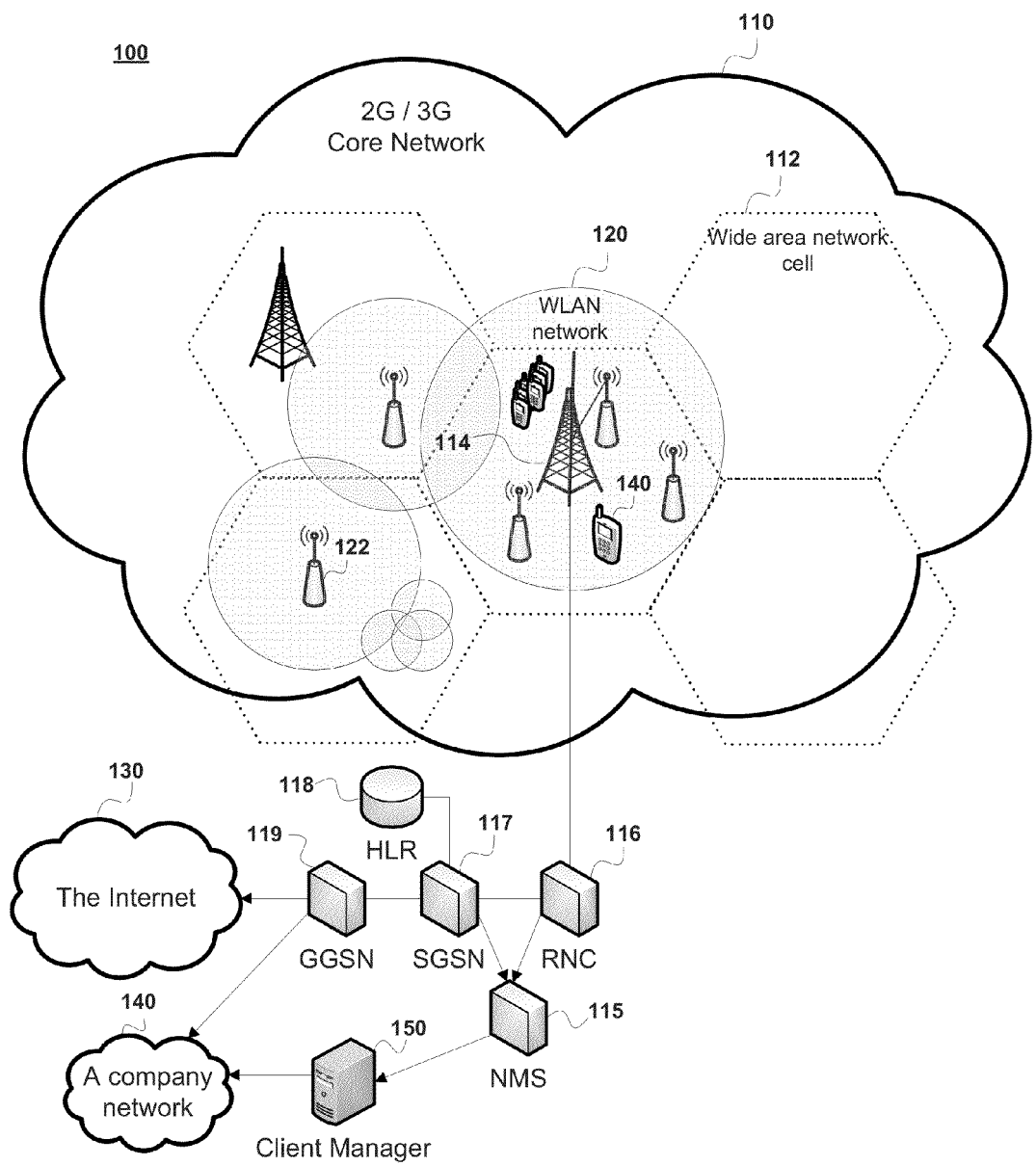
FIG. 1 is a block diagram showing the elements of the wireless wide area and local area communication systems.

FIG. 1 is a wireless communication system 100 in accordance with at least one embodiment of the present invention. The system 100 comprises of two or more communication systems having overlapping coverage area and having at least two communications protocols. FIG. 1 presents a 3G system 110 and a WLAN system 120 where the 3G system has a wider coverage compared to a WLAN system within the 3G coverage area. The 3G system is composed of plurality of cells 112, each of which is served by a base station 114. Further, the 3G system comprises network elements RNC 116, SGSN 117, HLR 118, and GGSN 119 to connect to the Internet 130. Network Management System (NMS) 115 interfaces with the Client Manager 150 to provide Core Network 110 originated information. The WLAN system 120 comprises access points (AP) 122 that serve the clients 140 using the WLAN system 120. FIG. 1 also present the problem where base station 114 serving multiple clients 140 may result in congestion where the data throughput of clients 140 drops to an unacceptable level. In most cases the area covered by the cell 112 also have WLAN networks 120. The WLAN system 120 may be managed by the operator of the 3G system 110 or by some other operator of similar 3G or other wide area wireless system, or private individuals.

Furthermore, those skilled in art will recognize that FIG. 1 does not depict all the necessary network devices and equipment necessary for system 100 to operate fully, but only those system blocks and logical entities particularly relevant to the description of the preferred embodiments of the invention. Those skilled in art are aware of the many ways the necessary components can be implemented.

System Description

Figure 2:
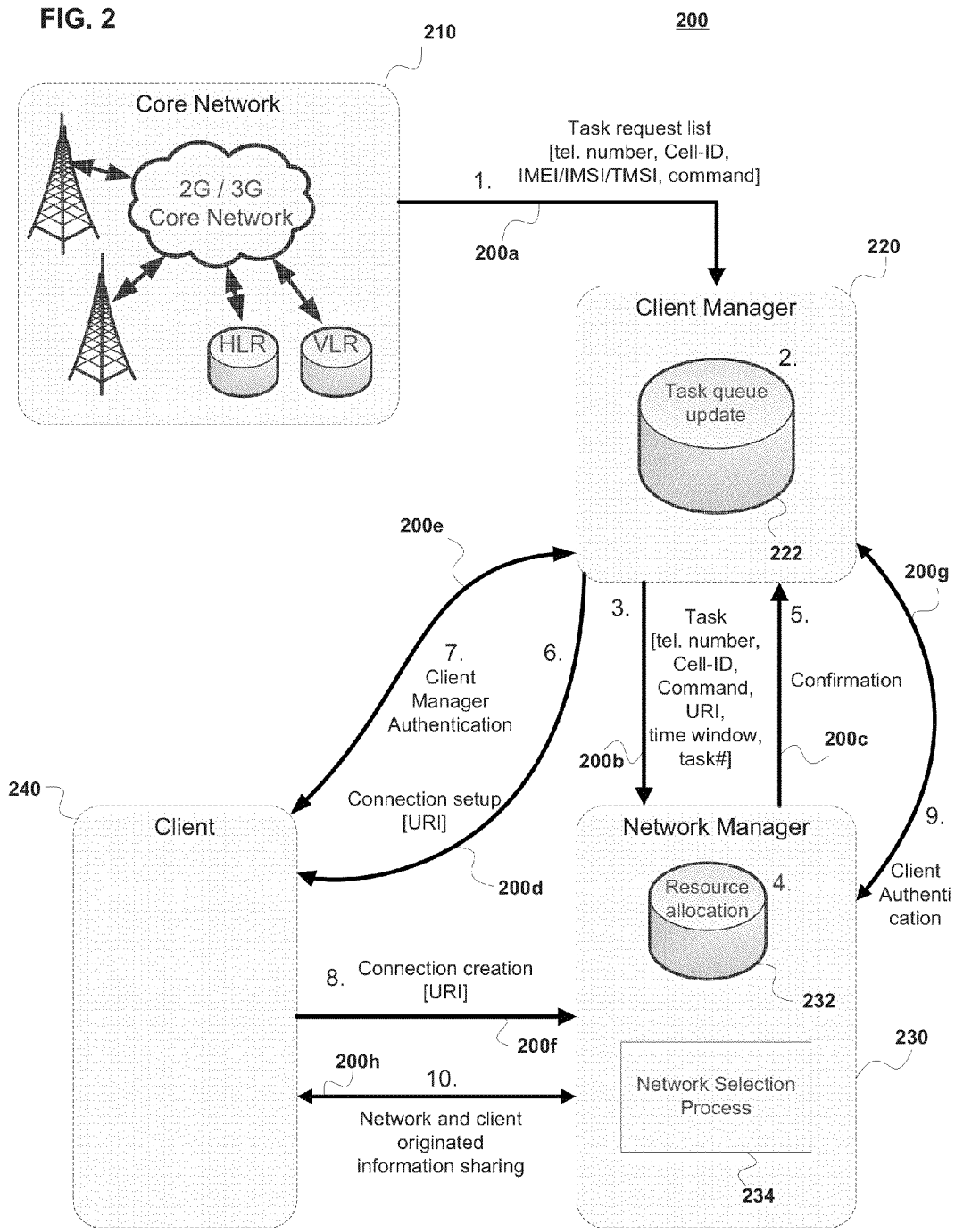
FIG. 2 is a block diagram of the overall system architecture and related interaction in accordance with the present invention.

FIG. 2 discloses a system architecture 200 of the preferred embodiments of the present invention. The architecture 200 comprise of four main elements of which a core network 210, presents the wide area network and its relevant components such as base station 114, RNC 116, SGSN 117, HLR 118, and GGSN 119. Client Manager 220 is the aforementioned system that provides the means for the core network 210 operators to manage the network selection of its subscribers. Network Manager 230 is the aforementioned system that provides means for the WLAN 120 operators to manage the network selection of the client 240, providing information about the network related details such as access credentials, and manage client 240 authentication. The FIG. 2 also presents high level messaging and information passing functions, with relevant phase, of the system 200.

FIG. 2 is explained hereafter according to at least one embodiment of the invention. The scenario starts with the assumption that the 3G core network 210 is serving a growing amount of subscribers 240 that are consuming the data transfer capacity of the network 210 eventually leading to a congestion situation where the network becomes overloaded. The bottle neck of the system performance may be for example the RNC 116, SGSN 117, or GGSN 118 or any other component or combination of components in the core network. The operator of such network could gain knowledge about the network congestion by gathering information about subscribers within each cell 112 and about the network itself. This information could be for example load in the network, base station 114 locations, data usage pattern, or user profiles. Based on this advanced knowledge the core network could implement hardware, software, or both that is able to put together a task list update request 200a to the Client Manager 220. The main function of the request is to identify potential subscribers within a specific cell 112 that would benefit from using possibly available WLAN network 120 instead of continue using 3G network 110 for data exchange in the Internet. Such task list update request 200a may contain information such as telephone number of the subscriber, cell-id of the 3G cell where it is currently operating, IMEI/IMSI/TMSI code of the subscriber, and a 3 G operator preferred action state to be associated with the subscriber. The action state in the most simplest form may be a 'ON'/'OFF' command string wherein the 'OFF' means that the network operator suggests that the subscriber should off-load from the 3G network and on the contrary 'ON' means that the network operator suggests that the subscriber should on-load back to 3G network. Here the term off-load refers to directing data traffic out from the 3G network to some other network and on-load refers to directing data traffic in to the 3G network form some other network.

The second entity in the system is a connection manager (CM) 220. The CM 220 could be for example a network server running in the Internet with capabilities to process task list update requests 200a from core network 210. Upon receiving a task list update request 200a the CM 220 will process the content of the request and update its internal data records 222. This processing may include assigning a unique task identifier for the received task and combining that with the information received in task list update request 200a. After the internal processing the CM 220 looks for relevant network manager (NM) 230 instances from its internal NM database where the measurement of relevance may be the location of the subscriber, 3G network load, or other statistics. This location may be derived from the cell id received in request 200a. After the selection the CM 220 creates an IP based connection to the NM 230 and sends a service request 200b to the NM 230 with all relevant client information included after which the NM 230 may allocate computing resources 232 for the given task. NM 230 may perform authentication for the CM 220 using for example a digital certificate. If the NM 230 is able and willing to allocate such resources it will confirm the service request back to CM 220. The availability of the allocated resources 232 may be limited to be valid only for a certain amount of time, accessed only using a specific URI provided in 200b, or the resource may be considered invalid if the first attempt to access the resource using the provided URI fails for any reason. If any such failure occurs, allocated resources 232 may be deallocated.

After NM 230 has finished with the resource allocation and related confirmation, CM 220 may send an SMS-message 200d to the defined CL 240 to set up a connection with the NM 230. Using a known digital certificate of the CM 220, CL 240 is able to authenticate the sender of the SMS 200d using a asymmetric public key infrastructure cryptography. In the SMS message 200d CM 220 may inform the CL 240 about the assigned NM 230 details, the given unique task identifier and the URI to which a new connection should be made. Using this information the CL 240 is able to establish a connection to the NM 230. Upon connection creation the CL 240 may send an authentication data to the NM 230, which then authenticates the CL 240 by bypassing the data to CM 220 and waits for a confirmation of the authentication. The authentication process instance in NM 230 authenticate mobile with the help of CM 220, keeps track on a time window that was priori set during a service request from CM 220, and also manage possible payment procedures any exists. Following the authentication the NM 230 and CL 240 are able to exchange data 200h. In this exchange of data NM 230 provides CL 240 detailed instructions about the preferred list of available WLAN networks 120. The selection of WLAN preferred WLAN networks, or Service Set Identifiers (SSID) hereafter, is carried out in a network selection process 234 in the NM 230. The list of SSIDs may be based on geographical location derived from the 3G cell-id received in a task allocation request 200b, or the NM 230 may request the CL 240 to provide list of SSIDs within its vicinity. Further the NM 230 will provide the required WLAN network credentials, such as WPA/WPA2 security keys, to the CL 240 when such credential exists. Following the message passing between CL 240 and the NM 230 the connection is closed and NM 230 may free the resources allocated for the task.

Figure 3:
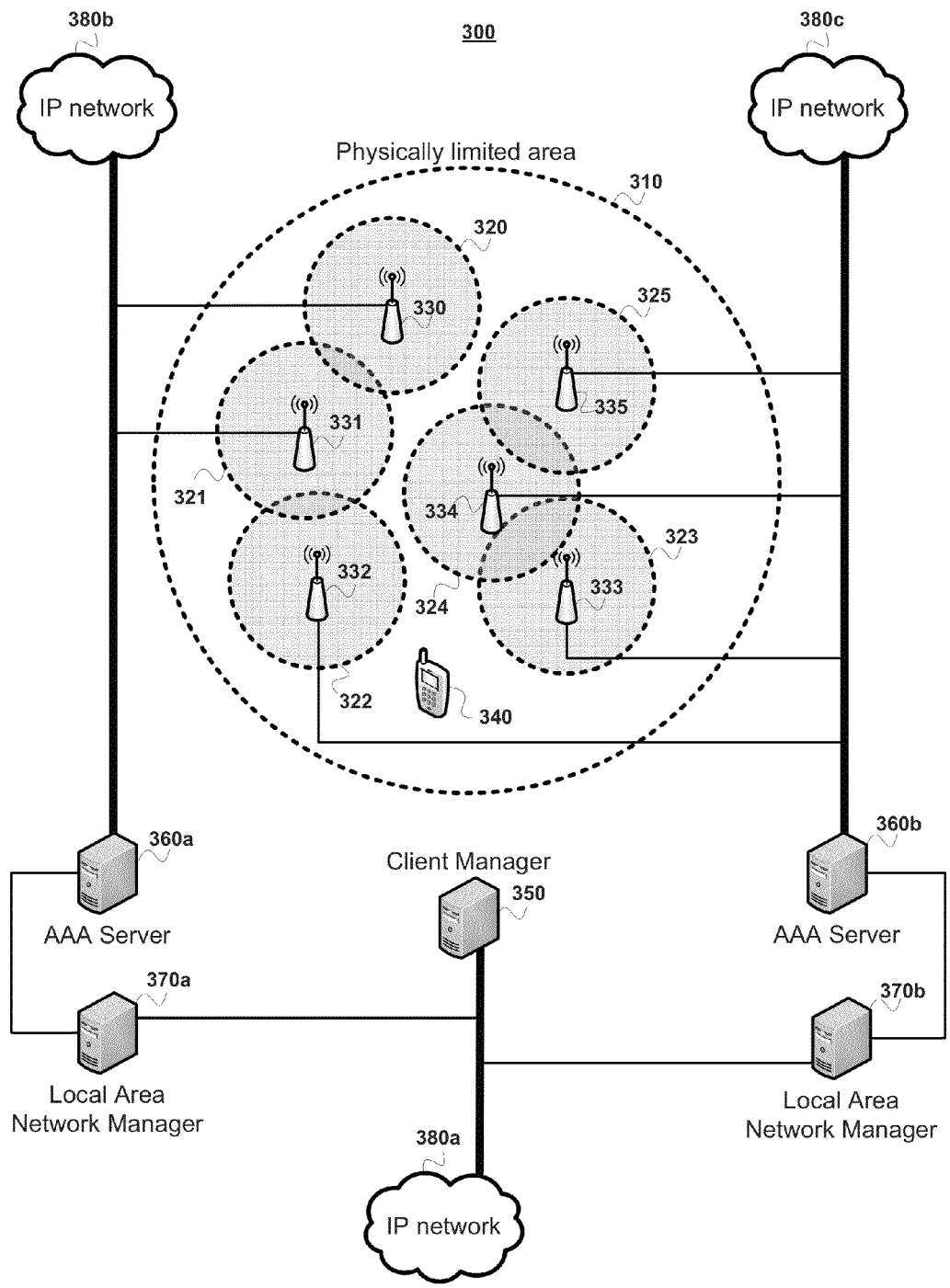
FIG. 3 is a block diagram showing the elements of the physically limited area with local area communications systems and related network server instances in accordance with the present invention.

According to a further aspect, the present invention may provide a system comprising a wide area access communication network 110; at least one localaccess communication network 360a and 360b; local area network manager 370a and 370b; client manager 350; and a mobile client device 140 in FIG. 1 and 340 in FIG. 3, the system further comprising means, based on information from said networks and based on information from the mobile client, to coordinate, in respect of the client device, data off-loading between said networks. In an embodiment the information from the wide area access communication network include congested area expressed, for example, in terms of cell id or telephony number of mobiles in a congested area, the information from the area access communication network include authentication information and the information from mobile client include data rate, mobility and local area access right characteristics of the mobile client and the user of the mobile client.

The system 100 of FIG. 1 introduces the problem addressed in the preferred embodiments of the invention where Mobile device 140 is connected to Internet 130 through a node 114 and related wide area network elements 116-119. The requirement of node 114 to concurrently serve numerous mobile devices results in congestion where all the mobile devices including the mobile device 140 served by the node 114 eventually suffer from low data bandwidth. On the hand, the area served by node 114 in most cases also has installed WLAN networks that as indicated may be managed by the same wide area operator as operating the 3G network or by some other operators or even private individuals.

One way to address the above mentioned problem is to install network management software to mobile device 140 forcing the mobile device to prefer Wi-Fi access to wide area network. The connection manager functionalities can already be found in mobile devices such as the Apple™ iPhone™ and the Nokia™ N900™. This solution, however, does not address the following: the end user cannot be sure of the reliability of a previously unknown network, obtaining and using the credentials for authentication is a major hassle and off-loading may also lead to congestion in WLAN network if too many mobile devices do independent off-loading decisions. Neither does this solution address the how wide area operator can monitor the usage of WLAN network by its subscribers and provide a incentive for WLAN network operators to open their network for the wide area operator to off-load its traffic as alternative to wide area infrastructure investment.

Another possibility to address the above mentioned problem is to implement a logical node in the operator network sending short messages (SMS) to mobile devices instructing handover from 3G to WLAN or vice versa, as presented in U.S. Pat. No. 7,295,540 B2. This approach however fails to address monetary compensation and authentication issues related to $3^{rd}$ party local area networks. In many case the wide area operator is not in position to build own local area coverage but it is more cost efficient to lease existing local area network capacity. These cases include buildings with already existing indoor WLAN coverage and the cases where mobile device roams in another country. In these cases it is necessary to manage secure local area authentication procedure for mobile devices and means for the wide area operator to keep records of leased network capacity. Also in cases where local area network is operated by the wide area network operator it is beneficial to be able to monitor the usage and thus avoid congestion in the local area network.

First Embodiment

The system 300 depicted in FIG. 3 introduces the geographically overlapping WLAN networks. WLAN Access Points (AP) 330-331 are operated by one operator and WLAN APs 332-335 are operated by second operator. Both WLAN networks are equipped with separate authentication, authorization and accounting (AAA) servers connected to the backbone IP networks 380b and 380c such that first AAA server 360a serves the APs 330-331 and second AAA server 360b servers the APs 332-335. The AAA server may be for example a Remote Authentication Dial-In User Service (RADIUS) server. As Mobile Device 340 establishes an internet access in the geographical area 310 it cannot access the said WLAN networks without valid authentication certificate.

The system 100 of FIG. 1 addresses the problem by introducing a CM 150. CM 150 is able to receive off-loading messages from 3G network 110. The said off-loading message identifies the mobile subscriber device 140, the cell-id of the wide area network cell in which the device 140 is operating in and an action proposal. In case of congested wide area node 114 or congested core network component such as SGSN 117 the action proposal proposes to off-load the client 140 from wide area network 110. When congestion no longer exists the reverse action statement may be received by the CM 150. For the WLAN network management system 300 in FIG. 3 introduce Local Area Network Managers (NM) 370a and 370b. As CM 150 receives an off-loading message it assigns a unique task in each NM 370a-370b. The unique tasks are combined with the addresses of the NM and sent to the mobile subscription identified in the off-loading message received from the wide area operator. The default way to deliver the off-loading message is through Short-Message-Service (SMS).

Figure 4:
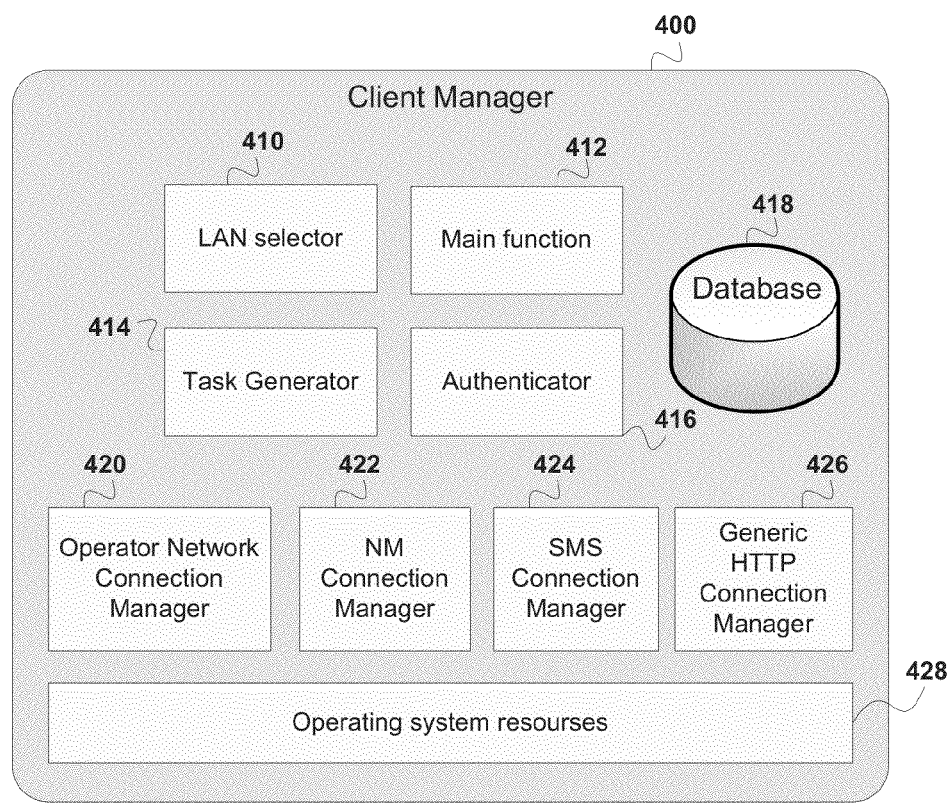
FIG. 4 is a block diagram of the exemplary client manager internal functional architecture in accordance with the present invention.

The computer of FIG. 4 presents an implementation of CM according to one embodiment. The computer system includes main function 412 responsible for setting up communication managers; operator network connection manager 420, NM connection manager 422, SMS connection manager 424 and generic http connection manager 426. The main function initiates task generation function 414 and authentication function 416. The task generation 414 binds itself with operator network connection manager 424 and executes as presented in the flowchart in FIG. 5. In the local area network selection process the task selection uses LAN selector procedure 410. When called the LAN selector procedure 410 executes according to the flowchart presented in FIG. 7 it uses generic http connection manager 426 to conduct the optional auction process. The task selector 414 uses NM connection manager 422 to communicate with NMs according to process presented in FIG. 5. The task selector 414 uses SMS connection manager 424 to send off-loading indicators to the selected mobile devices. The authentication function 416 binds itself with NM connection manager 422 and executes as presented in the flowchart depicted in FIG. 6. The task selector 414 uses NM connection manager 422 to communicate with NMs according to process presented in FIG. 5. LAN selector procedure 410 uses operator network connection manager 420 to update its parameters and threshold values for operator specific off-loading criteria. LAN selector procedure 420 uses NM connection manager 422 to update its parameters and threshold values for criteria to be used in various local area networks. It is also possible that no local area networks that meet the operator specific criteria are found in the procedure.

Figure 5:
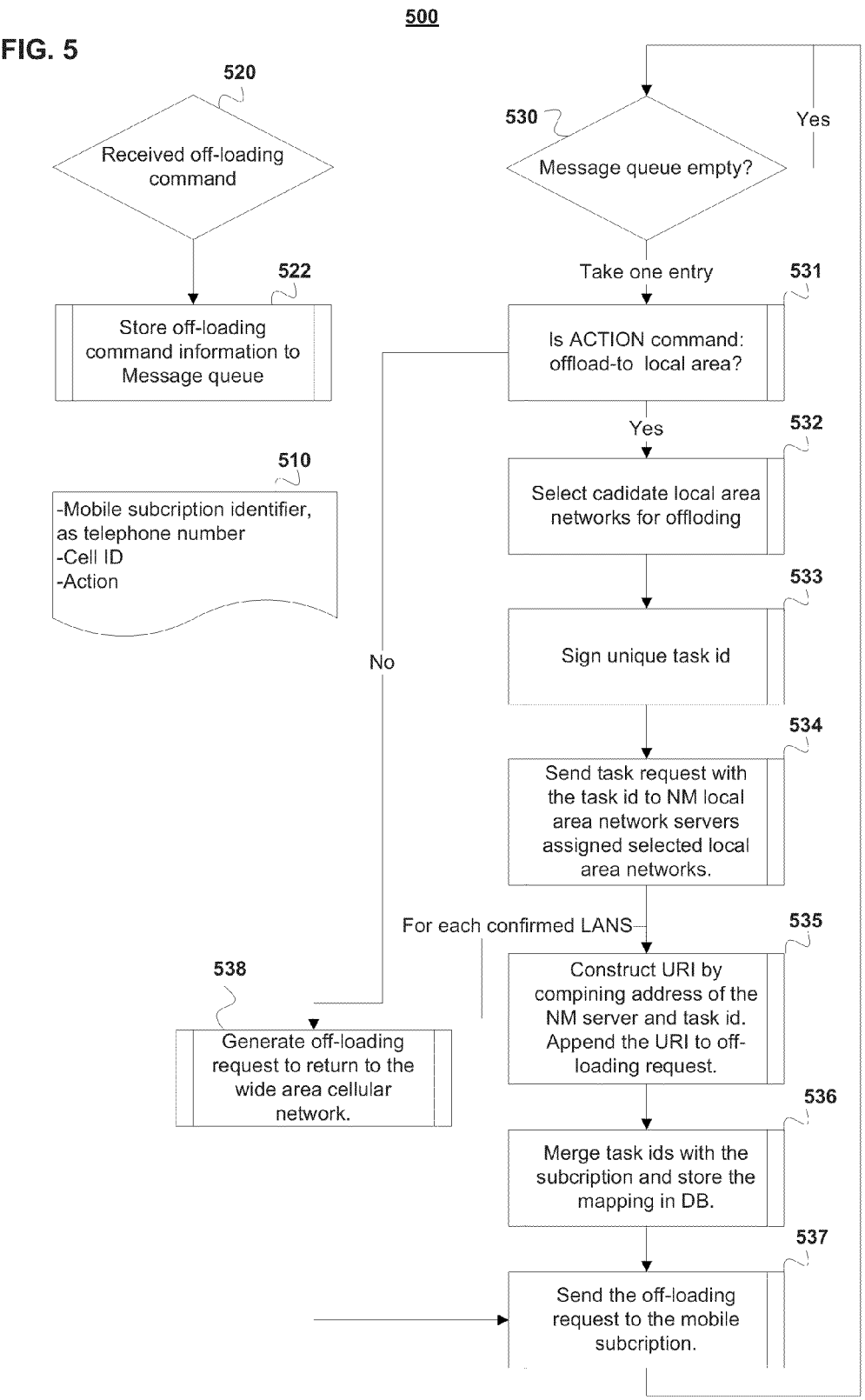
FIG. 5 is a flow diagram of a process for facilitating action command processing and off-load messaging in accordance with the present invention.

FIG. 5 depicts a flowchart of CM process that is triggered as an off-loading message is received from the wide area network according to one embodiment. In start-up CM initiates the means to communicate with core network and the NM. As off-loading message is received, in step 520 it is stored in the memory of the CM in step 522. The example of saved content is presented in 510. As data is stored, in step 522 the iterative step 530 results "false" and one entry is extracted from the store for further processing. In step 531 the action command is evaluated. If the action command is from wide area to local area the process continues in 532, otherwise in 538. In step 532 a set of proper local area networks are determined as candidate local area networks. The selection process includes mapping the candidate local area networks to local area network servers (NM) assigned for the local area network in the region specified by cell id. Various embodiments of the selection process are discussed in FIG. 7. In step 533 a unique task id is generated for each selected NM and the task ids are associated with the mobile subscription. In step

534 CM ensures that the selected NM have allocated recourses for the task and identified the resources with the unique task id. In this embodiment the ensuring takes place by sending a task request with the task id and waiting certain duration for the confirmation. Step 535 is iterative. For each confirmed NM, a Universal-Resource-Identifier (URI) is generated by merging the address of NM and the task id. In step 537, the URIs are send to the mobile subscription embedded in the off-loading message. A method for sending is to use Short-Message-Service (SMS). In one embodiment off-loading message also includes a key that will be used to generate the authentication certificate. Step 538 is executed if the action command indicates returning to the wide area network. In this case off-loading request is embedded with indication to return to the wide area network.

Figure 6:
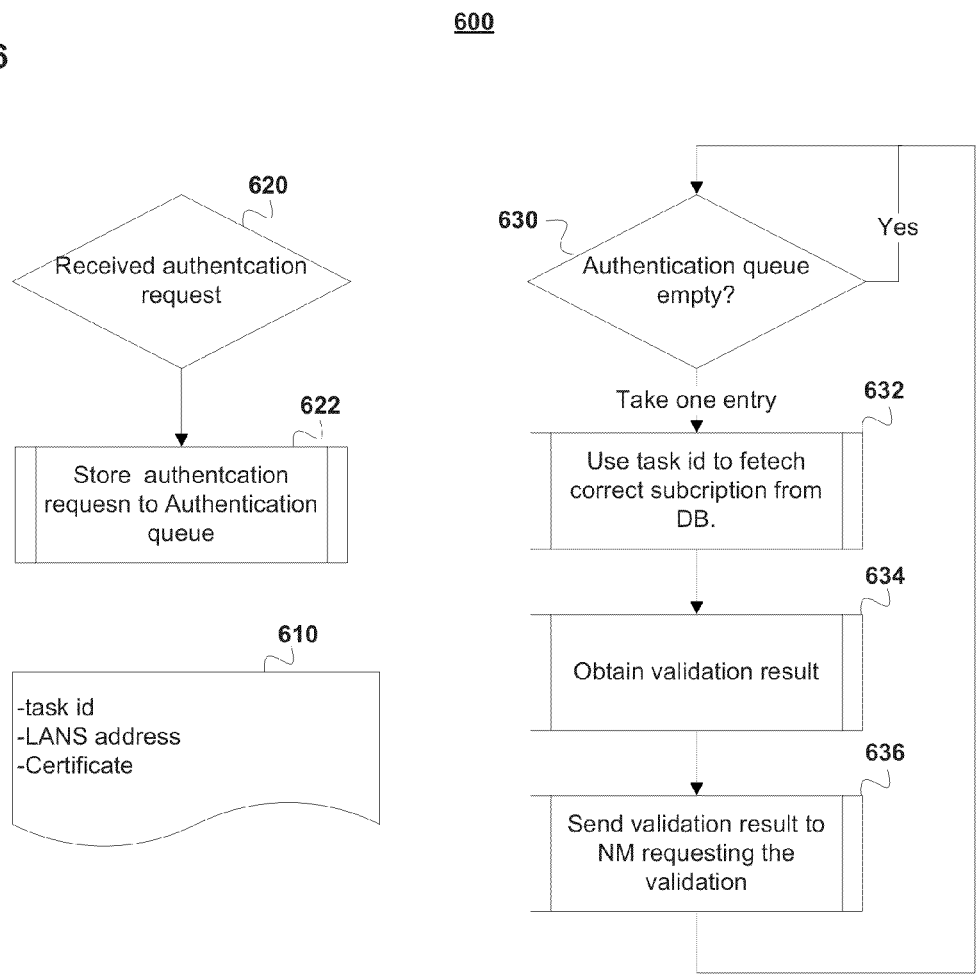
FIG. 6 is a flow diagram of a process for facilitating authentication requests and confirmations in accordance with the present invention.

FIG. 6 is a flowchart of CM process that is triggered as CM receives the authentication request from a NM according to one embodiment. As authentication request is received, in step 620 it is stored in memory of CM in step 622. The example of saved content is presented in 610. As data is stored, in step 622 the iterative step 630 results "false" and one authentication request entry is extracted from the store for processing. In step 632 the task id is read from the authentication request and it is matched with the mobile subscription attached to the task id using the database. In step 634 the certificate is validated by applying a common secret key know the mobile subscription and the CM. Examples of the common secrets are IMEI, IMSI, TMSI code, or permutation of IMEI code by an integer embedded to the off-loading requests. In step 636 the validation result is returned to the NM requesting the validation process.

Figure 7:
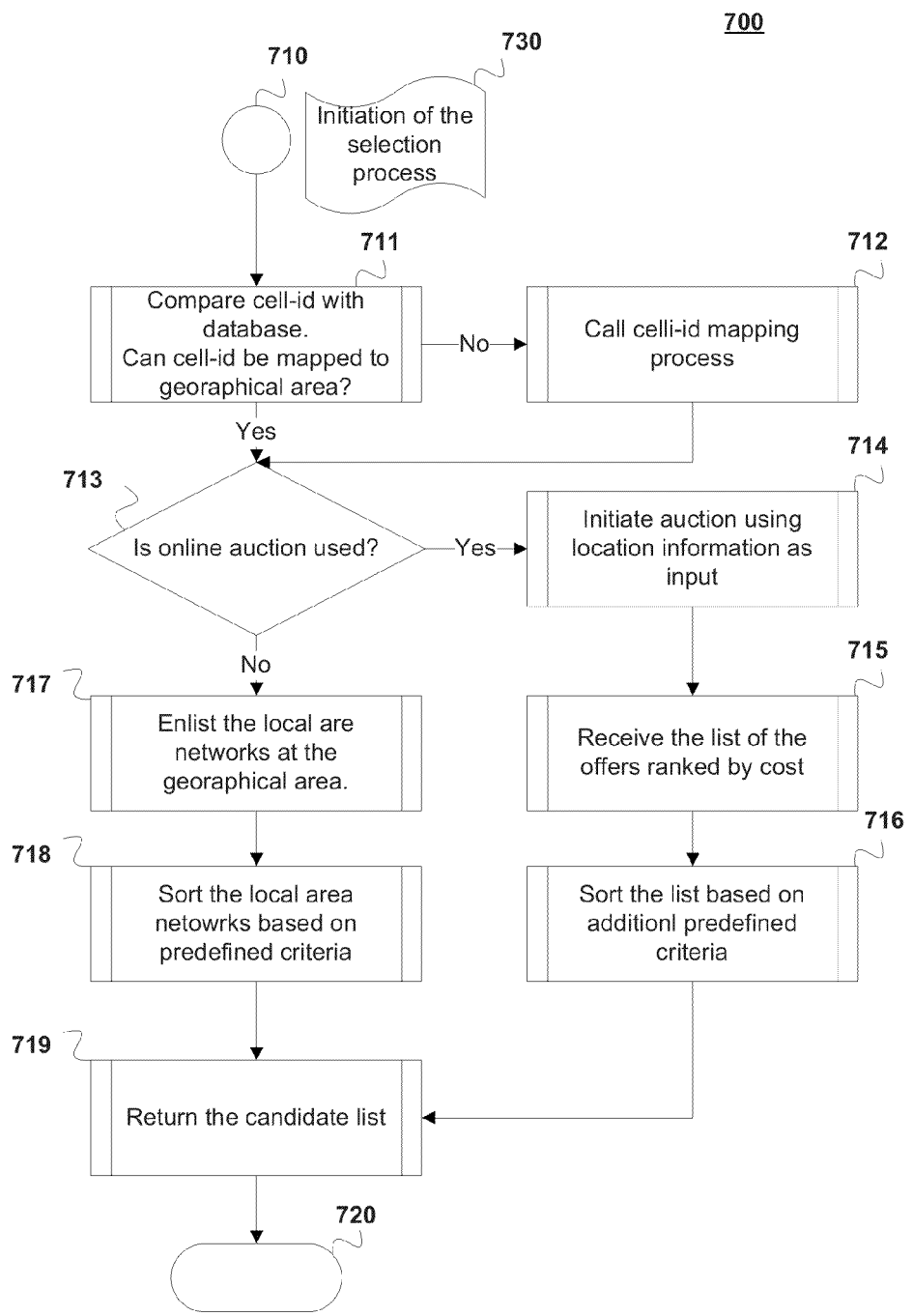
FIG. 7 is a flow diagram of a process for facilitating position information and online auction information for selecting a local area network in accordance with the present invention.

FIG. 7 is a flowchart of local area network selection procedure, which is called in 532 in FIG. 5, according to one embodiment. In Step 711 cell-id is mapped to geographical area using the database. The area is expressed as location of the cell, in terms of latitude and longitude, and the coverage area. The default unit for the coverage area is the range of the cell, expressed in meters. If the mapping cannot be done using the own database step 712 is executed. In step 712 an external service is used. In step 713 it is determined whether an online auction scheme is used to select candidate local area operators. Steps from 717 to 718 disclose the procedure without the online action scheme. In step 717 the location and coverage information is suit to sort out the available local area networks. In step 718 the available local area network are sorted based on predefined criteria. The criteria consist of a weighted function of cost, quality-of-service and on available information the current load status. The quality-of-service may be obtained using statistical information of the users that have been off-loaded to the network previously. This information may be generated automatically by the user device or additional user surveys may be conducted. The current load status may be estimated by the amount of previously off-loaded subscribers. Steps from 714, 715, and 716 disclose the procedure with the online action scheme. In step 714 online auction service is called using the location information as input. Additional input includes usage duration in time or amount of data to be bought in the auction. In step 715 the results of the auction are received in sorted based on the lowest bids. In step 716 additional criteria is used to sort out the auction results. Sorting criteria includes quality-of-service parameter similar to step 718. In step 719 the results are returned and the flowchart in FIG. 3 continues, see step 532. As an example, the auction scheme can be implemented by a mobility management service company, such as iPass.

Second Embodiment

The second embodiment differs from the first embodiment that the off-loading command triggering the process described by flowchart 500 as in FIG. 5 is initiated by an Internet Service provider instead of wide area operator. Examples of such internet operators include Nokia™, Google™, and Apple™. The problem addressed by this embodiment is the differentiation need of the Internet Service provider in a very competitive market place. By off-loading the users of its services the internet service provider can differentiate in the user experience by offering constant high quality connection. From business model perspective it is also possible to bundle the off-loading as part of the device offering.

Third Embodiment

The third embodiment differs from the first embodiment in that the off-loading message, sent to mobile device of the selected mobile subscribers in step 537 of FIG. 5, also includes indication whether all existing sessions should be off-loaded as well or only new sessions initiated after off-loading has taken place in the mobile device. Similarly return message, described in step 538 of FIG. 5, may also include indication whether also existing local area sessions should be returned to wide area networks or only the new sessions.

Fourth Embodiment

Figure 8:
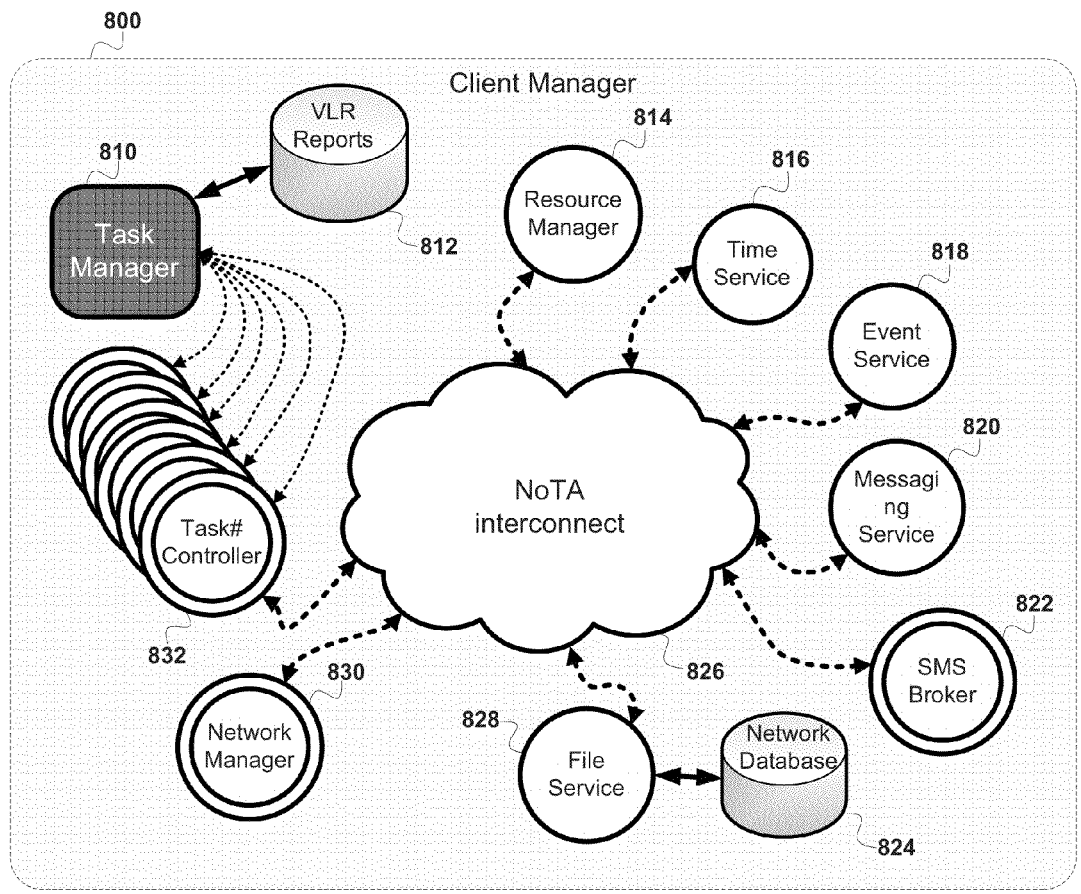
FIG. 8 is a block diagram of exemplary implementation architecture of the client manager in accordance with the present invention.

FIG. 8 disclose a block diagram of an example implementation of the client manager 150 described in the preferred embodiments of the invention based on Network on Terminal Architecture (NoTA). For simplicity only the assigned functionality of each element are described here leaving the details of implementation open.

Task Manager 810 is a user application that initiates the off-loading process based on a) off-loading request from Core Network 110, or b) generates off-loading task queue using a Core Network Managements System report 812, or c) client-originated guidance request (update request). Task Manager 810 allocates unique task identifier and spawn identifier specific task control processes or application nodes 832 to the system. Each Task# Controller 832 send requests for Network Management 830 and after successful allocation of Network Management server send off-load message to the client 140. Task manager also keep statistics and collect reports for each task identifier. Resource Manager 814 is a service node SN that controls the usage of service nodes in the system. These service nodes are for example: Time Service 816 producing timing functions, Event Service 818 that produce system wide events to various ANs and SNs, and Messaging Service 820 that provide the system for means to exchange XML messages between each node connected to the NoTA interconnect. SMS Broker application node AN 822 is responsible for receiving SMS messages and passing provided information through Messaging Service to rest of the system for further processing. File service 828 provides an interface for ANs and SNs to access platform file system or any database system 824, like MySQL™ and PostgreSQL. Network Management selects appropriate network server 230 and send request to provide guidance for selected client 140 with allocated task identifier. Network Management 830 takes care of all communication between Network Management server 230 and Client Manager Task# Controller 832. After task completion, Network Management server 230 may send report to the Network Management AN 830, send close signal and close the communication socket to the Network Management AN 830, close the link to the client 140, and release its resources bound to this task.

Further Embodiments

Figure 9:
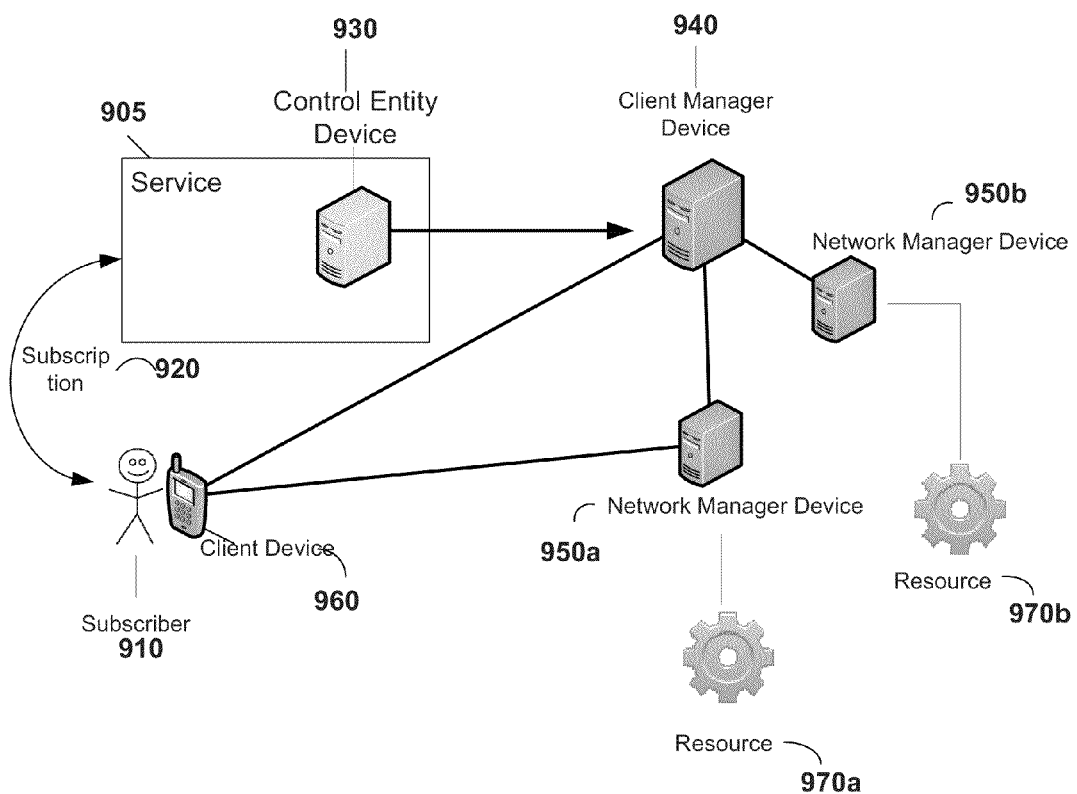
FIG. 9 is a block diagram of exemplary system in accordance with an embodiment of the invention.

In accordance with an embodiment of the invention illustrated in FIG. 9, a system 900 comprising a client manager entity 940 and one or more network manager entities 950a, 950b is provided. The system 900 may further comprise a client device 960. The client manager entity 940 may be configured to facilitate a process for allocating a resource based on a request. The client manager entity 940 is configured to exchange information with one or more network manager entities 950a, 950b and with the client device 960. Furthermore, the one or more network manager entities 950a, 950b are configured to exchange information with the client manager entity 940 and with the client device 960. Conversely, the client device 960 is configured to exchange information with the client manager entity 940 and with the one or more network manager entities 950a, 950b.

An entity, such as the client manager entity 940 or the network manager entity 950a, 950b, may be embodied as a dedicated device or apparatus using software means, hardware means, or a combination of software and hardware means. Alternatively, an entity may be embodied as a part of a device or apparatus, using software or hardware means, or combination thereof. In particular, a device or an apparatus may have one or more entities embodied therein, and a given entity may be provided as a software process to be executed and or run by a device or an apparatus.

Exchanging information between a first entity and a second entity, as referred to hereinbefore and hereinafter, is construed to comprise providing at least one piece of information from the first entity to the second entity and/or at least one piece of information from the second entity to the first entity. The information may be provided using one or more messages.

The system may further comprise a control entity 930. A service provider (not shown in FIG. 9) may be configured to provide a service 905 to a subscriber 910 based on a subscription 920. A service provider may control, operate and/or have an access to a network, and the control entity 930 may be configured to operate as part of this network. Hence, the subscription 920 is associated with the service 905 and with the subscriber 910. Consequently, the subscriber 910 and the subscription 920 are associated with the control entity 930 via the service 905.

The subscriber 910 may use the client device 960 to access the service 905 on the basis of the subscription 920, thereby associating also the client device 960 with subscription 920 and with the control entity 930. In other words, in such a scenario the client device 960 is directly associated with the service 905. This kind of service 905 may be for example mobile communication service provided by a cellular telecommunication operator or a network access provided by an internet service provider (ISP).

Alternatively, the subscription 920 may entitle the subscriber 910 to access the service 905 without the client device 960 being directly—or at all—involved. In this scenario the subscriber 910 may be provided with access credentials, such as a username and a password, to enable the subscriber 910 to associate the client device 960 with the subscription 920. Alternatively, the service provider may have information regarding a client device 960 associated with a subscription 920, and the service provider may use this information to provide additional service(s) or resource(s) on the basis of the subscription 920, thereby enabling the client device 960 to be involved accessing the additional service(s) or resource(s). As an example, this kind of service 905 may be a subscription 920 to a newspaper or a magazine or a membership to a community or an association etc. that may indirectly entitle the subscriber 910 to additional service(s).

The control entity 930 may be configured to provide service 905 to the subscription 920, or to the client device 960 associated with the subscription 920, by providing a request to allocate a resource 970a, 970b for the subscription 920 or on behalf of the subscription 920. The request to allocate a resource 970a, 970b may be provided, or sent, to the client manager entity 940, or another entity configured to facilitate the reservation of the resource. The control entity 930 may be configured to provide the request to allocate a resource 970a, 970b at least in part in response to observed conditions associated with the subscription 920 and/or the client device 960 associated with the subscription 920. The observed conditions may be related for example to preferences or other corresponding information associated with the subscription 920, such as type(s) of service the subscriber 910 is entitled to receive or interested in receiving on the basis of the subscription 920. As further examples, the observed conditions may be related to the location of the client device 960 associated with the subscription 920, to observed network conditions and/or to resources available in the proximity of the client device 960 associated with the subscription 920, and/or observed traffic patterns of the network traffic sent by or received by the client device 960 associated with the subscription 920. In particular, the observed conditions may comprise monitoring conditions within a network, such as a telecommunication operator's core network, for example by monitoring the traffic in a network, issuing a location inquiry or location inquiries to a network, and/or issuing inquiry or inquiries regarding data transfer activity associated with a subscription 920 in a network. Furthermore, the observed conditions may comprise receiving information on the behavior of the subscription 920 from a client device 930 associated therewith.

The client manager entity 940 is configured to receive a request to allocate a resource 970a, 970b. The request comprises information associated with a subscription 920, referred to as the first information hereinafter The first information may comprise a subscription identifier associated with the subscription 920, such as a telephone number, an email address, a subscription number, and/or any information suitable to identify the subscription 920. The request may comprise, as part of the first information or in other part(s) of the request, location information associated with the subscription 920, for example information regarding a physical location in general, such as GPS coordinates, (postal) address or the like. Alternatively or additionally, the location information may comprise for instance information identifying a cell of a cellular network, information identifying a local area network access point, a network address or geographical information associated with the subscription 920 as such and/or indicating the current location of the client device 960 associated with the subscription 920. The request may further comprise, as part of the first information or elsewhere in the request, a quality of service requirements associated with the subscription 920.

The request to allocate a resource 970a, 970b may comprise an indication of the resource 970a, 970b to be allocated for said subscription 920 as part of the first information or elsewhere in the request to allocate a resource 970a, 970b. The indication of the resource 970a, 970b to be allocated may comprise an exact identification of the resource 970a, 970b or an identification of the type of resource 970a, 970b to be reserved, for example in form of a resource identifier. Alternatively, the client manager entity 940 may obtain the information identifying the resource 970a, 970b or the type of a resource 970a, 970b by other means, or the type of the resource 970a, 970b may be known from the context. The resource 970a, 970b may be for example, access to a local area network, access to data storage accessible over a network, access to a (shared) device, access to a rental car, access to a parking space, (credential entitling to) a movie ticket, etc.

The client manager entity 940 is further configured to select a network manager entity 950a, 950b among one or more network manager entities 950a, 950b. The selection of the network manager entity is based at least in part on the request to allocate a resource 970a, 970b and/or information comprised therein. The client manager entity 940 may be further configured to use any further information it may have on the one or more network manager entities 950a, 950b. Such further information may comprise for example location of the one or more network manager entities 950a, 950b, information regarding the availability of a given network manager entity 950a, 950b or information regarding availability or the terms and/or conditions for accessing resources 970a, 970b available via a given network manager entity 950a, 950b. The further information may be static or dynamic, the latter implying that the further information is updated to reflect the current conditions affecting the client manager entity 940, the one more network manager entities 950a, 950b and/or the resources 970a, 970b accessible via the one or more network manager entities 950a, 950b.

The client manager entity 940 is further configured to exchange information, referred to as the second information hereinafter, regarding the resource 970a, 970b to be allocated with the selected network manager entity 950a, 950b. The client manager entity 940 is configured to derive information regarding the request to allocate a resource based at least in part on the first information, and to provide the derived information to the selected network manager entity 950a, 950b as part of the second information. The derived information may be provided to the selected network manager entity 950a, 950b as a resource allocation inquiry. The client manager entity 940 may be further configured to obtain a resource indicator associated with the resource to be reserved. Obtaining the resource indicator may comprise for example the client manager entity 940 receiving the resource indicator as part of the request to allocate a resource or as part of the first information, or determining the resource indicator. Consequently, the client manager entity 940 is configured to provide the received or determined resource indicator to the selected network manager entity 950a, 950b as part of the second information. Alternatively, the client manager entity 940 may be configured to provide a request for a resource indicator, for example based on the first information, to the selected network manager entity 950a, 950b as part of the second information. Consequently, the selected network manager entity 950a, 950 provides the resource indicator, in response to successful reservation of a resource, to the client manager entity 940 as part of the second information.

The client manager entity 940 is further configured to provide information regarding the resource 970a, 970b (to be) allocated, referred to as the third information hereinafter, to the client device 960 in response to the exchange of the second information. The information may be provided to the client device 960 for example as part of an information exchange between the client manager entity 940 and the client device 960, possibly comprising also further messages sent and/or received by the client manager entity 940. The client manager entity 940 may be configured to determine the content of the third information at least in part based on the information received from the selected network manager entity 950a, 950b as part of the second information. The client manager entity 940 may be further configured to determine the content of the third information based at least in part on the information received in the request to allocate a resource 970a, 970b, such as the first information.

The third information may comprise for example information that enables the client device 960 to establish a connection or otherwise contact the selected network manager entity 950a, 950b, such as a universal resource identifier (URI) or a universal resource locator (URL), sometimes also referred to as a uniform resource indicator/identifier or a uniform resource locator, respectively. The third information may further comprise an authentication certificate or information that may be used to generate an authentication certificate required to access the selected network manager entity 950a, 950b and/or the reserved resource. The client manager entity 940 may be configured to provide or exchange the third information to the client device 960 using a unidirectional message, such a Short Message Service (SMS) message. The exchange of information comprising the third information may be bidirectional instead of unidirectional, and/or the exchange of information may comprise one or more messages. Furthermore, for example an email message or a dedicated messaging protocol may be used instead of or in addition to SMS to exchange information comprising the third information The client device 960 is configured to establish a connection with the selected network manager entity 950a, 950b and to perform authentication with the selected network manager entity 950a, 950b. Hence, the selected network manager entity 950a, 950b is configured to authenticate the client device 960. The connection establishment and/or the authentication are based at least in part on the third information. The connection establishment and/or the authentication may be further based at least in part on information obtained from sources other than the third information and/or based at least in part on information (pre-)stored locally or determined locally at the selected network manager entity 950a, 950b and/or at the client device 960.

The selected network manager entity 950a, 950b is further configured to exchange information regarding the resource 970a, 970b, referred to as the fourth information hereinafter, with the one or more network manager entities 950a, 950b. Access to the resource 970a, 970b may be based at least in part on credentials and/or usage terms. Hence, the exchange of fourth information may comprise for example the selected network manager entity 950a, 950 providing credentials associated with the resource 970a, 970b and/or usage terms associated with the resource 970a, 970b to the client device 960 in order to enable the subscriber 910 to use the client device 960 to access the resource 970a, 970b.

The credentials associated with the reserved resource comprised in the fourth information may comprise for instance credentials required to access a local area network, such as WiFi access credentials that enable accessing a WLAN network. The credentials associated with the reserved resource may comprise for example an access code, a reservation identifier, a username, and/or a password required to access the reserved resource, which may need to be delivered through a local connectivity interface or provided otherwise when accessing the reserved resource.

The client device 960 may be configured to access to the resource 970a, 970b allocated for the subscription 920 with which the client device 960 is associated based at least in part on credentials and usage terms provided to the client device 960 in response to the request to allocate resource for the subscription 920.

The usage terms received by the client device 960 may comprise for example an indication of the authentication scheme applied upon accessing the reserved resource 970a, 970b, a name of a network to connect in order to access the reserved resource 970a, 970b, an identification of the network or access technology to be applied when accessing the reserved resource 970a, 970b, and/or information regarding a reply to be provided as a reply to a specified challenge issued by the network to be connected in order to access the reserved resource 970a, 970b. Further examples on the usage terms include information regarding the location of a network to be connected in order to access the reserved resource 970a, 970b and/or a software application or a software module to be downloaded and/or applied in order to use the reserved resource 970a, 970b, possibly accompanied by a network address from which the software application or module may be downloaded.

In accordance with an embodiment of the invention, the system 900 may further comprise a resource allocation entity for facilitating the allocation of a resource. The resource allocation entity is configured to exchange information regarding the reservation of a resource 970a, 970b, referred to as fifth information hereinafter, with the one or more network manager entities 950a, 950b. The fifth information may comprise information that enables the resource allocation entity to store information regarding the resources 970a, 970b offered by the one or more network manager entities 950a, 950b and terms and conditions associated therewith. In a system 900 comprising a resource allocation entity, the client manager 940 may be configured to exchange the second information with the resource allocation entity instead of or in addition to the second information exchanged with the one or more network manager entities 950a, 950b. In such a case the second information may further comprise information regarding terms and conditions associated with the offered resources 970a, 970b, and the exchange of second information may comprise providing the information regarding terms and conditions associated with the offered resources 970a, 970b to the client manager entity 940.

In a system 900 comprising a resource allocation entity, the client manager entity 940 is further configured to select a network manager entity 950a, 950b among said one or more network manager entities 950a, 950b based at least in part on the information regarding the terms and conditions associated with the offered resources 970a, 970b. The information regarding the terms and conditions associated with the offered resources 970a, 970b may comprise, for example, information regarding temporal availability of a resource 970a, 970b, information regarding a capacity associated with a resource 970a, 970b, pricing information associated with a resource 970a, 970b, etc.

The resource reservation entity may act for example as a market place entity/device facilitating an online auction regarding the reservation of a resource 970a, 970b. In such a scenario the one or more network manager entities 950a, 950b may be configured to provide offers comprising information regarding terms and conditions, including pricing information, associated with a resource 970a, 970b to the resource reservation entity, which in turn provides the information associated with the offered resources 970a, 970b it receives from the one or more network manager entities 950a, 950b to the client manager entity 940.

Although the features and elements of the preferred embodiments invention are described in the previous embodiments in a specific combinations, each feature or element can be used alone without the other features or elements of the embodiments or in a various combinations with or without the other features or elements of the preferred embodiments of the invention.

The following numbered clauses describe some embodiments of the invention.

Clause 1. A method comprising, receiving a message listing of at least one subscription identification, position information and action command, selecting at least one local area network based at least partly on said position, ensuring a valid task identification for the said subscription in the selected local area network server of each selected local area network, and sending off-loading indication message containing said action, said task identification and the address of each selected local area network server to said subscription.

Clause 2. The method as described in clause 1, further comprising receiving request to authenticate a subscription from a local area network server; and performing authentication procedure for the information embedded in the said request; and returning the authentication result to the said local area network server.

Clause 3. The method as described in clause 1, further comprising selecting the local area network at least partly based on pricing policy in place between the wide area network operator and local area network operators.

Clause 4. The method as described in clause 1, further comprising selecting the local area operator at least partly based on initiating an auction using an online auction service.

Clause 5. The method as described in clause 1, wherein the position information is given as cell-id of the wide area network of the wide area network operator.

Clause 6. The method as described in clause 1, wherein the subscription identification is a telephone number, IMSI, or IMEI code.

Clause 7. The method as described in clause 1, wherein the action command indicates to start off-loading from wide area network to an available local area network or start off-loading from local area network to wide area network.

Clause 8. The method as described in clause 1, wherein a unique task identification is sent to the selected local area network server; and receiving a confirmation of the allocated resources for the said task.

Clause 9. The method as described in clause 1, wherein a unique task identification request is sent to the selected local area network server; and receiving a unique task identification and confirmation of the allocated resources for the said task.

Clause 10. The method as described in clause 1, 8 or 9, wherein the task identification is merged with the Universal-Resource-Locator (URL) of the local area server to form a unique Universal-resource-Identificator (URI).

Clause 11. The method as described in clause 1 or 10 further comprising the local area network server address of the local area network server in the off-loading indication message is divided in to a static part and a dynamic part and only the dynamic part is sent in the off-loading message.

Clause 12. The method as described in clause 1, wherein the off-loading indication message is send using at least one short-message-service message.

Clause 13. A system comprising, a processor capable to execute program code, a suitable memory capable to store code and data, a communications interface configured to receive a message listing of at least one subscription identification, position information and action command, program code configured to select at least one local area network based at least partly on said position, and to ensure a valid task identification for the said subscription in the selected local area network server of each selected local area network; and a communication interface configured to send off-loading indication message containing said action, said task identification and the address of each selected local area network server to said subscription.

Clause 14. The system as described in clause 13, further comprising receiving request to authenticate a subscription from a local area network server; and performing authentication procedure for the information embedded in the said request; and returning the authentication result to the said local area network server.

Clause 15. The system as described in clause 13, wherein the selection of the local area network is at least partly based on pricing policy in place between the wide area network operator and local area network operators.

Clause 16. The system as described in clause 13, wherein the selection of the local area operator is at least partly based on initiating an auction using an online auction service.

Clause 17. The system as described in clause 13, wherein the position information is given as cell-id of the wide area network of the wide area network operator.

Clause 18. The system as described in clause 13, wherein the subscription identification is a telephone number, IMSI, or IMEI code.

Clause 19. The system as described in clause 13, wherein the action command indicates to start off-loading from wide area network to an available local area network or start off-loading from local area network to wide area network.

Clause 20. The system as described in clause 13, wherein a unique task identification is sent to the selected local area network server; and receiving a confirmation of the allocated resources for the said task.

Clause 21. The system as described in clause 13, wherein a unique task identification is sent to the selected local area network server and a confirmation of the allocated resources for the said task is received.

Clause 22. The system as described in clause 13, wherein the task identification is merged with the Universal-Resource-Locator (URL) of the local area server to form a unique Universal-resource-Identificator (URI).

Clause 23. The system as described in clause 13, wherein the local area network server address of the local area network server in the off-loading indication message is divided in to a static part and a dynamic part and only the dynamic part is sent in the off-loading message.

Clause 24. The system as described in clause 13, wherein the communication interface configured to send off-loading indication message containing said action, said task identification and the address of each selected local area network server to said subscription is a Short-Messaging-Service (SMS).

Clause 25. The system as described in clause 13, wherein the communication interface configured to receive a message listing of at least one subscription identification, position information and action command is an Ethernet card or a virtual Ethernet card.

What is claimed is:

1. A method to be executed by a client manager server that comprises a processing device and a data storage device in communication with said processing device, said client manager in communication with a wide area network, the method, comprising:

receiving a first message from a network element of the wide area network, the first message comprising i) a subscription identification of a mobile device that is connected to said wide area network, ii) position information associated with said mobile device, and iii) an action proposal associated with said mobile device, said action proposal comprising an instruction for the mobile device to start off-loading data traffic from said wide area network to a local area network;

selecting, based at least in part on said position information, a local area network server for said mobile device, said local area network server being configured to control access to one or more local area networks;

sending, to said selected local area network server, a second message comprising a first task identification;

receiving from the selected local area network server a second task identification for enabling access to said selected local area network server;

constructing a uniform resource identifier comprising a network identifier of said selected local area network server and said second task identification;

storing a record that maps said first and second task identifications to said subscription identification; and sending an off-loading indication message to the mobile device for enabling said mobile device to access the selected local area network server, the off-loading indication message comprising said action proposal and said uniform resource identifier.

2. The method of claim 1, further comprising:

receiving a request from the local area network server to authenticate the mobile device, said request comprising a task identifier;

performing an authentication procedure based at least in part on said task identifier; and returning an authentication result to said local area network server.

3. The method of claim 1, wherein said selected local area network server is selected based at least in part on a pricing policy in place between an operator of said wide area network and an operator of said local area network server.

4. The method of claim 1, wherein said selected local area network server is selected based at least in part on an auction using an online auction service.

5. The method of claim 1, wherein said position information comprises a cell-id of the wide area network.

6. The method of claim 1, wherein the subscription identification of the mobile device comprises any of a telephone number, an IMSI code, and/or an IMEI code.

7. The method of claim 1, wherein the off-loading indication message is sent using at least one short-message-service (SMS) message.

8. The method of claim 1, wherein said local area network server is configured to control access to two or more local area networks.

9. The method of claim 1, wherein said local area network server is separate from said one or more local area networks.

10. An apparatus, comprising:

a processing device;

a memory device, in communication with said processing device, configured to store program code and data; and a network interface operated by said processing device and in communication with a wide area network, wherein the memory device has program code stored thereon configured to cause the processing device, when executed by the processing device, to cause the apparatus to receive a first message from a network element of the wide area network, the first message comprising i) a subscription identification of a mobile device that is connected to said wide area network, ii) position information associated with said mobile device, and iii) an action proposal associated with said mobile device, said action proposal comprising an instruction for the mobile device to start off-loading data traffic from said wide area network to a local area network, select, based at least in part on said position information, a local area network server for said mobile device, said local area network server being configured to control access to one or more local area networks;

send, to said selected local area network server, a second message comprising a first task identification;

receive from the selected local area network server a second task identification for enabling access to said selected local area network server;

construct a uniform resource identifier comprising a network identifier of said selected local area network server and said second task identification;

store a record that maps said first and second task identifications to said subscription identification; and send an off-loading indication message to the mobile device for enabling said mobile device to access the selected local area network server, the off-loading indication message comprising said action proposal and said uniform resource identifier.

11. The apparatus of claim 10, wherein the program code is further configured to, when executed by the processing device, cause the apparatus to receive a request from the local area network server to authenticate the mobile device, said request comprising a task identifier, perform an authentication procedure based at least in part on said task identifier, and return an authentication result to said local area network server.

12. The apparatus of claim 10, wherein the program code, when executed by the processing device, causes the apparatus to select the local area network server based at least in part on a pricing policy in place between an operator of said wide area network and an operator of said local area network server.

13. The apparatus of claim 10, wherein the program code, when executed by the processing device, causes the apparatus to select the local area network server based at least in part on an auction using an online auction service.

14. The apparatus of claim 10, wherein said position information comprises a cell-id of the wide area network.

15. The apparatus of claim 10, wherein said subscription identification of the mobile device comprises any of a telephone number, an IMSI, and/or an IMEI code.

16. The apparatus of claim 10, wherein the program code is further configured to, when executed by the processing device, cause the apparatus to send said off-loading indication message as at least one ShortMessaging-Service (SMS) message.

17. A system, comprising:

a client manager entity for facilitating provision of local area network connectivity, said client manager entity in communication with a wide area network; and one or more network manager entities for controlling access to respective one or more local area networks, wherein said client manager entity comprises a processing device and a memory device, the memory device having stored thereon instruction code configured to cause the client manager entity upon execution by the processing device to receive from a network element of the wide area network a request to allocate a resource comprising access to a local area network, said request comprising first information associated with a mobile device that is connected to said wide area network, said first information comprising i) a subscription identification of said mobile device, ii) position information associated with said mobile device, and iii) an action proposal associated with said mobile device, said action proposal comprising an instruction for the mobile device to start off-loading data traffic from said wide area network to the local area network, select, based at least in part on said position information, a network manager entity for said mobile device among said one or more network manager entities based at least in part on said first information, send, to said selected network manager entity, a message comprising a first task identification, receive from the selected network manager entity a second information including a second task identification for enabling access to said selected network manager entity, and construct a uniform resource identifier comprising a network identifier of said selected network manager entity and said second task identification, store a record that maps said first and second task identifications to said subscription identification, send an off-loading indication message to said mobile device for enabling said mobile device to access the selected network manager entity, the off-loading indication message comprising said action proposal and said uniform resource identifier, wherein said selected network manager entity is configured to authenticate said mobile device based at least in part on contents of the off-loading indication message, and to carry out an exchange of resource information regarding said resource with said mobile device, said exchange including providing credentials and usage terms associated with said resource to said mobile device.

18. The system of claim 17, wherein said first information comprises location information associated with said mobile device, and wherein said request comprises an indication of the resource to be allocated.

19. The system of claim 17, wherein said first information comprises a quality-of-service requirement associated with said mobile device.

20. The system of claim 17, wherein said off-loading indication message is provided using unidirectional Short-Message-Service (SMS).

21. The system of claim 17, wherein said credentials associated with said resource comprise at least one of WiFi access credentials and a code to be delivered through a local connectivity interface when accessing the resource.

22. The system of claim 17, wherein access to said resource is based at least in part on said credentials and said usage terms.

23. The system of claim 17, wherein said usage terms comprise at least one of an authentication scheme, a network name, a network technology to be applied, a reply for a specified challenge issued by the local area network for connection thereto, a location of the local area network, a further software for use of the allocated resource, and an internet address from which to download said further software.

24. The system of claim 17, further comprising:

a resource allocation entity for facilitating access to one or more local area networks, wherein said resource allocation entity and said one or more network manager entities are configured to exchange storing information to enable said resource allocation entity to store one or more resources offered by said one or more network manager entities and terms of conditions associated therewith, wherein said second information also comprises information regarding terms of conditions associated with any resources offered by the selected network manager entity, and wherein said client manager entity is further configured to select the selected network manager entity from among said one or more network manager entities based at least in part on said information regarding terms of conditions associated with said resources offered by the selected network manager entity.

25. The system of claim 17, wherein said network element is configured to provide said request at least in part in response to observed conditions associated with said mobile device.

26. The system claim 25, wherein obtaining said observed conditions comprises at least one of monitoring the telecommunication operator's core network traffic, issuing location inquiries to the telecommunication operator's core network, issuing subscription data activity inquiries to the telecommunication operator's core network, receiving information on the behavior associated with said subscription from said mobile device.

* * * * *